Patented Feb. 7, 1933

1,896,300

UNITED STATES PATENT OFFICE

ALBERT F. O. GERMANN, OF CLEVELAND, OHIO, ASSIGNOR TO S. M. A. CORPORATION, OF CLEVELAND, OHIO, A CORPORATION OF OHIO

SOLUBLE CASEIN

No Drawing.    Application filed December 19, 1929.   Serial No. 415,359.

This invention relates to milk products, and more particularly to the protein content thereof, especially the casein. The object of the invention is to provide an improved and soluble form of casein available for various commercial uses and capable of production in large quantities at low cost and by ordinary methods, and which form of casein also has lower or reduced viscosity as compared with prior forms of casein, whereby, for certain uses, it is preferable to the more viscous forms and is more satisfactory from various standpoints in the manufacture of ice cream and other edible products. Although the invention is useful in connection with casein prepared for industrial uses such as for plastics, glue, paints, paper size, etc., it finds greater utility in the higher quality carefully prepared edible casein products, but is not limited thereto.

It is well recognized that casein is relatively insoluble in water unless peptized or made soluble in some alkaline form. Gortner (page 14, Casein and its industrial applications, published 1927 by the Chemical Catalog Co., Inc., New York) says of it:

"It reacts as a weak acid, is insoluble in water, alcohol and other neutral organic solvents, and readily soluble in water containing the hydroxides or the carbonates of the alkali or alkaline earth metals."

Some of the alkaline caseinates, such as sodium caseinate, have ben applied to various industrial uses, such as for an ingredient of an ice cream mix (Zoller Patent 1,598,033, patented August 31, 1926), the purpose being to control the overrun or swell of the ice cream by maintaining a suitable surface tension of the mix. Nevertheless, alkaline caseinates for this purpose, as well as for other purposes, have not been wholly satisfactory, one reason being the objection to their high viscosity, by reason of which it is difficult to make up solutions thereof on a factory scale because of the great tendency of the material to swell when in contact with water, forming clots or lumps which are difficult to break down by mixing, which very materially interferes with proper mixture and solution when the material is used in ice cream, in addition to which alkaline caseinate solutions have more or less of an objectionable soapy taste that at times becomes disagreeably pronounced.

For the foregoing and other reasons, as well as to secure a less viscous mixture which is more readily handled, it is desirable to provide an improved soluble form of casein not hitherto recognized as available for use, and my invention aims to provide such a material.

At first blush, disregarding the question of viscosity and following precedent, it would seem to be clear that soluble casein may only be formed by the production of an alkaline solution, either a fixed alkaline solution utilizing the hydrates or salts of magnesium, calcium or the like, or a volatile-alkali solution, such as ammonia and water, or solutions of alkylamines, such as methylamine. However, there are certain objections to the use of fixed alkaline solutions, such as their high ash content and higher viscosity, and experience with volatile-alkali solutions does not suggest their suitability for the purposes. For example, a volatile-alkali solution of casein may be prepared by suitably treating casein with ammonia, but soluble ammonium caseinate, when exposed to air, loses most of its ammonia and usually reverts to the original insoluble casein, in addition to which a solution of ammonium caseinate in water, when exposed to air, loses both water and ammonia, usually again resulting in the deposition of the original insoluble casein.

Such action on the part of volatile-alkali caseinates has led to the expectation that drying of a volatile-alkali caseinate should always produce the well known insoluble form of casein. Strange to say, experience has shown that this is not universally true. According to what are the conditions during the drying operation, the effect of drying volatile-alkali caseinates, such as ammonium caseinate, by ordinary processes, such as by exposure to air or in a vacuum pan, is quite indeterminate, producing a more or less insoluble or soluble product. More often than not the caseinate may revert to the former insoluble form. However, when it is reduced to dryness under special and definite conditions, such as with extreme rapidity and while in a state of very fine subdivision, as occurs in an ordinary spray drier or powder mill, the product is uniformly very highly soluble, with solubility of the same order or degree as sodium caseinate, in addition to which the viscosity may be decreased and the material has other advantageous properties.

In other words, I have discovered that by dissolving casein by the use of a volatile alkali, such as ammonia, by proper treatment, and then removing the water and ammonia or other volatile solvent very rapidly while the material is very finely divided, such as by spray drying, no opportunity is afforded for hydrolysis or chemical action internal to the droplets or fine particles, and the product to all intents and purposes uniformly retains the solubility in water of the volatile-alkali caseinate from which it is formed. Therefore, soluble casein not only is capable of production with certainty on a large scale by present day practical and commercial processes, but also it is produced in a form which is useful in all places where fixed alkali caseinates or other soluble forms of casein have heretofore been employed, in addition to which the improved material may have reduced viscosity, and its solution has no objectionable soapy taste, so that for many purposes, such as for use in an ice cream mix, it is far superior to the fixed alkali caseinates, such as sodium caseinate.

Practice and experience with the material have led to certain impressions, although what actually occurs is by no means certain. At first it was thought that the extremely high solubility might be due to failure to completely remove the ammonia by the spray drying or evaporating step. That, however, was proved not to be the case, because careful analysis of many samples of the soluble casein prepared by spray drying ammonium caseinate showed a lower ammonia content than ordinarily is found either in ammonium caseinate which has been permitted to stand exposed for a long time, or in casein or casein products prepared by other processes than with the use of ammonia. For example, two samples of spray dried ammonium caseinate with a solubility averaging about 86% were found to contain respectively .0051% and .1275% of ammonia, whereas two samples of ammonium caseinate prepared by exposing 20 mesh ground casein to ammonia gas under pressure and storing for over a year, one in an air tight can and the other in a closed paper bag, were found to contain respectively .68% and .18% ammonia. Indeed, sodium caseinate may and usually is found to contain a higher percentage of ammonia than was found in the samples of spray dried ammonium caseinate referred to.

The most reasonable explanation is that the high solubility, as well as the low viscosity, may be accounted for by the extremely high state of division of the casein particles resulting from spray drying. By spray drying the material, the individual droplets of ammonium caseinate solution at a concentration of 10% or 15% total solids lose both water and ammonia in the heated atmosphere of the powder mill so rapidly that there is no time for chemical changes, such as hydrolysis, to occur in the casein molecule. The water and ammonia vaporize so rapidly as to presumably form tiny bubbles within the small droplets, leaving finally only the non-volatile casein in the form of thin films. The resulting powder formed from a collection of such tiny particles of casein has very large surface exposure when these thin casein films are taken into consideration. The films are of colloidal dimensions and may be expected to have more or less the property of colloids. Moreover, this form of casein is probably so soluble that solution occurs without material swelling of the casein films, as distinguished from the appreciable swelling which takes place when solution is produced by the use of an alkali.

That the solubility of this form of casein is probably due to its physical rather than to its chemical condition is evidenced by the fact that microscopic examination of a sample of the product has disclosed a more or less hollow shell-like structure, the particles being somewhat like broken eggshells. Moreover, some of this spray-dried soluble casein has been dissolved in water and found to be completely soluble, and the solution thereof has been dried by other processes than spray drying, such as by permitting a film of the material to dry in the open air on a glass plate. Microscopic examination of such dried film has again disclosed the characteristic form resembling broken eggshells, leading to the supposition that instead of a true solution, the mixture of this material with water produces a colloidal dispersion equivalent to solution. However, while colloidal principles are suggested as a possible explanation of the behavior of the material, I do not wish to be understood as offering such suggestions with any certainty of technical accuracy, and solubility herein should be understood as meaning not only ordinary solubility according to the theory of solutions, but also colloidal dispersions or other equivalents therefor.

From the standpoint of solubility, casein made according to my invention is substantially completely soluble when fresh, with its solubility decreasing slightly with age over a long period. Solubility determinations have been made by shaking a weighed quantity of the material in water at 100° F. for a definite time, say thirty minutes, filtering, evaporating the filtrate to dryness, and comparing the weight of the dried residue with the weight attempted to be dissolved. By such determinations, my casein is 100% soluble when fresh, and a sample six months old was found to have lost 3.4% solubility.

As to viscosity, my improved casein also may be uniformly less viscous than a high quality carefully prepared edible sodium caseinate, the difference between them in relative viscosity increasing with the concentration, but such difference in viscosity is not essential, as it depends in large measure upon the manner in which the material is used, the strength of the solution, etc. By a series of tests with a Stormer viscosimeter, relative viscosities of the two materials at different concentrations were obtained as follows:

| Concentration | Sodium caseinate | Spray dried casein |
|---|---|---|
| Per cent |  |  |
| 1 | 1.05 | 1.05 |
| 3 | 1.06 | 1.08 |
| 5 | 1.15 | 1.13 |
| 7 | 1.30 | 1.20 |
| 10 | 1.60 | 1.35 |
| 12 | 2.20 | 1.53 |

Every figure in the above table is the average of ten readings. It will be observed that at the lower concentrations the relative viscosities of the two materials were much alike, but with the spray dried casein a little less than the sodium caseinate, but in the higher concentrations the difference in relative viscosity was quite marked.

Of course, casein prepared by my method differs from sodium and like soluble caseinates in a number of respects, the chief one of which is that it contains no added fixed base, because it is preferably produced by precipitation from milk by a method which, if anything, tends to reduce rather than to increase the fixed base, usually included in analyses with the ash content. Acid precipitation is therefore preferable, because of the low ash content due to separation of the calcium originally present in the natural milk. Porcher (Chimie & Industrie, Vol. 19, No. 4, April, 1928) says:

"Casein exists in milk in the form of the caseinate of calcium which is combined with calcium phosphate to form what I have called the complex calcium caseinate plus calcium phosphate."

It is well recognized that acid precipitation of casein, carefully accomplished, with proper washing, etc., removes a very large proportion of the calcium and salts and correspondingly reduces the ash content. When such methods of precipitation are employed, therefore, or with any method of casein precipitation which does not increase or which reduces the ash content, the casein prepared by my method not only has no added fixed base, but is more or less free of fixed base, due to the method of preparation. The only alkali involved in its preparation is the ammonia, but both the ammonia and water are driven out nearly entirely by the spray drying step. The casein of my invention and referred to in the claims, therefore, may be understood to be not a caseinate within the ordinary acceptation of that word, but a material having similar constitution to the casein originally precipitated from the milk, which, according to the method of precipitation, possibly involves some removal or reduction of calcium or other salts.

In the preparation of the material, casein is first separated from milk by any suitable well known method, such as acid precipitation, followed by washing, draining and other steps, to remove albumen, fats, milk sugar, salts and other like materials. The casein is then converted to ammonium caseinate in any suitable manner, either wet or dry, and by the use of either ammonia gas under pressure or a solution of ammonia in water. Sufficient water is used to produce the desired degree of concentration, say 10% or 12%, and with the material homogenized so as to be of uniform texture and suitable for treatment, it is spray dried in an ordinary spray drier, by introducing it in the form of a mist or spray into a current of heated air in a chamber, whereupon the water and most of the ammonia are removed, as described, and the fine dust falls to the floor and is collected and removed, as is usual in all spray drying. The ammonia gas may be recovered in any suitable manner, such as by absorption in acids, or by adsorption on suitable surfaces, to be returned for treatment of further casein. As a result, the ammonia gas, in this method, is more or less a carrier, merely playing the part of a medium to convert the original insoluble casein into soluble volatile-alkali caseinate for the purpose of spray drying the same, but playing no part in the composition of the final product, from which it is nearly wholly removed.

Soluble casein formed according to my invention is particularly useful in an ice cream mix for controlling the overrun, but in proper proportions it has the advantage of decreased viscosity, is more readily handled and may be more thoroughly mixed or incorporated with other ingredients and without liability of formation of clots or lumps than sodium caseinate. It is also useful for many other purposes; indeed, for any where sodium or other soluble caseinate or any soluble form of casein is required or desirable.

Other advantages of my invention will be apparent to those skilled in the art.

What I claim is:

1. A method of preparing soluble casein, consisting in peptizing casein with a suitable volatile alkali, and removing the volatile alkali and water at a rate and with the material so finely divided that internal chemical changes do not take place and the resulting product has solubility in water of the same order as sodium caseinate.

2. The method of producing soluble casein, consisting in peptizing casein with ammonia, and spray drying the mixture to remove both ammonia and water, leaving soluble casein.

3. A method of the character described, consisting in treating casein with ammonia and water to produce a casein solution, spray drying the solution, collecting the dried residue, recovering the ammonia gas, and utilizing said gas to treat additional casein.

4. A casein-like product containing no added fixed alkali base and having solubility in water of the same order as sodium caseinate, the viscosity of a water solution thereof being less than that of a corresponding solution of sodium caseinate.

In testimony whereof I hereby affix my signature.

ALBERT F. O. GERMANN.